(12) United States Patent
Katou et al.

(10) Patent No.: US 6,564,917 B2
(45) Date of Patent: May 20, 2003

(54) STARTING CLUTCH

(75) Inventors: Yoshiaki Katou, Fuji (JP); Nobushi Yamazaki, Tochigi (JP)

(73) Assignees: Jatco Transtechnology Ltd. (JP); Tochigi Fuji Sangyo Kabushiki Kaisha (JP)

(*) Notice: Subject to any disclaimer, the term of this patent is extended or adjusted under 35 U.S.C. 154(b) by 0 days.

(21) Appl. No.: 09/950,350

(22) Filed: Sep. 12, 2001

(65) Prior Publication Data
US 2002/0033313 A1 Mar. 21, 2002

(30) Foreign Application Priority Data

Sep. 21, 2000 (JP) ........................................ 2000-286365

(51) Int. Cl.$^7$ ............................................... F16D 13/38
(52) U.S. Cl. ...................... 192/70.14; 192/35; 192/84.7
(58) Field of Search ........................... 192/70.14, 70.17, 192/55.61, 30 V, 35, 84.7, 84.91

(56) References Cited

U.S. PATENT DOCUMENTS

| | | | | |
|---|---|---|---|---|
| 3,000,479 A | * | 9/1961 | Mosbacher | 192/35 |
| 3,215,234 A | * | 11/1965 | Hirano | 192/35 |
| 5,617,938 A | * | 4/1997 | Tsukada et al. | 192/55.61 |
| 5,788,037 A | | 8/1998 | Forsyth et al. | 192/70.12 |
| 6,302,253 B1 | | 10/2001 | Link et al. | 192/55.61 |
| 6,332,521 B1 | * | 12/2001 | Shoji | 192/55.61 |
| 6,397,996 B1 | * | 6/2002 | Yabe | 192/55.61 |

FOREIGN PATENT DOCUMENTS

| | | |
|---|---|---|
| DE | 100 05 447 A1 | 8/2000 |
| DE | 100 05 996 A1 | 9/2000 |

* cited by examiner

*Primary Examiner*—Rodney H. Bonck
(74) *Attorney, Agent, or Firm*—Rossi & Associates

(57) ABSTRACT

Drive system torsional vibration resonance while an engine is idling is prevented. An input clutch pack is connected to a rotating drive plate connected to the engine. The input clutch pack is formed from a drive side comprising an input drum, metal plates, and a retaining plate and from a driven side comprising an input clutch hub and facing plates. When the input clutch pack is disengaged, the inertial mass on the engine side with the engine serving as the vibration source, the coil spring, and the inertial mass on the drive side form a single-degree-of-freedom drive system torsional vibration model. By increasing the thickness in the axial direction of the metal plates, the drive side inertial mass is made to be 50% to 100% of the engine side inertial mass. As a result, drive system torsional vibration resonance during idling is prevented while the weight increase is kept to a minimum.

10 Claims, 3 Drawing Sheets

STARTING CLUTCH

BACKGROUND OF THE INVENTION

1. Field of the Invention

The present invention relates to a starting clutch that is provided on the input side of a transmission mechanism of a vehicle transmission.

2. Description of the Prior Art

A starting clutch used for starting a vehicle is provided on the input side of a transmission mechanism. The starting clutch is disengaged while the engine is idling. When the vehicle starts running, for example, after a gear position for starting such as first speed gear has been set, the starting clutch is fully engaged after passing through a partially engaged state so as to transmit torque from the engine to the transmission mechanism.

Technology relating to a starting clutch is disclosed in, for example, Japanese Patent Application Laid-Open Publication No. 10-78052. In the technology of the publication No. 10-78052, a simplification and a decrease in weight of the structure of the starting clutch are aimed.

A description will now be given of the structure of this starting clutch. A cylindrical sleeve is fixed at the outer periphery of an end portion on the drive plate side of an input shaft of the transmission mechanism. A drum is fixed in connection with the sleeve. A pressure plate and a plurality of ring-shaped plates are spline fitted to the inner periphery of the cylindrical portion of the drum.

A hub that faces the cylindrical portion of the drum is disposed on the input shaft via a bearing so as to be freely rotatable. The hub is linked to the drive plate via a cylindrical case and the drum is disposed inside this case. Between the hub and the cylindrical portion of the drum, a plurality of ring-shaped discs that are capable of movement in an axial direction are fitted via a spline to the outer periphery of the hub. These discs and the aforementioned plates are provided in alternation and when the starting clutch is engaged, the discs and plates are united by the pressing force so as to transmit the rotation.

The discs that are fitted to the hub on the driving side to which the driving force of the engine is transmitted via the drive plate have a comparatively thin plate thickness, while the plates that are fitted to the drum on the driven side have a comparatively thick plate thickness.

In many vehicles, in order to prevent shock when the starting clutch is engaged, it is normal for a torsional damper to be installed between the engine torque output portion and the drive side drum.

However, when a torsional damper is used, in the structure in the above described conventional technology, the drive side inertial mass of the starting clutch is small, and the concern exists that resonance from torsional vibration in the drive system will be generated while the engine is idling and the starting clutch is disengaged.

Namely, in the conventional technology, because a hub having a small diameter is on the drive side, while a drum having a large diameter is on the driven side, and because comparatively thin discs are provided for the hub, while comparatively thick plates are provided for the drum, the inertial mass on the drive side is small. As a result, there is a strong possibility of torsional vibration resonance being generated in the vicinity of the idling speed.

SUMMARY OF THE INVENTION

Therefore, the present invention has been conceived in order to solve the above problem in the conventional technology, and it is an object thereof to provide a starting clutch that prevents resonance from torsional vibration in the drive system being generated while the engine is idling.

The first aspect of the present invention is a starting clutch that is provided at an input side of a transmission mechanism of a vehicle transmission comprising: a drum for receiving rotation drive force from an engine via a torsional damper provided with a spring; a hub that is provided at an inner side of the drum and that is linked to an input shaft of the transmission mechanism; and drive side plates and driven side plates that mesh respectively with the drum and the hub and are stacked together in alternation, wherein a plate thickness of the drive side plates is made thicker than a plate thickness of the driven side plates.

By using this structure, the inertial mass on the drive side is increased and it is possible to prevent drive system torsional vibration resonance from being generated when the engine is idling.

Further, the increasing of the plate thickness is also connected to an increase in rigidity and an increase in the thermal capacity and also improves the judder resistance as well as the heat resistance and durability of the clutch.

In addition, by altering the plate thickness of the drive side plates, it is possible to adjust the drive side inertial mass in accordance with the engine side inertial mass.

In the second aspect of the present invention, the plate thickness of the drive side plates is set such that drive side inertial mass from a member that is linked to the drum, sandwiching the torsional damper spring and including the drive side plates, is 50% to 100% of engine side inertial mass from an engine side member.

By using this structure, it is possible to keep the weight increase caused by increasing the drive side inertial mass to the minimum.

In the third aspect of the present invention, a floating plate is provided between the driven side plates and a flange portion formed integrally with the hub.

By using this structure, it is possible to prevent the facing surface of the driven side plate from peeling or becoming abraded.

In the fourth aspect of the present invention, when no floating plate is provided, only the driven side plate closest to the flange portion is formed without a friction material being adhered to the surface of this driven side plate on the side that makes contact with the flange portion.

By using this structure, it is possible to prevent the facing surface of the driven side plate from peeling or becoming abraded even when no floating plate is provided.

In the fifth aspect of the present invention, the plate thickness of the drive side plates is made the same for each plate.

By using this structure, the heating value created by the friction is dispersed uniformly thereby increasing the heat resistance and durability.

BRIEF DESCRIPTION OF THE DRAWINGS

The nature of this invention, as well as other objects and advantages thereof, will be explained in the following with reference to the accompanying drawings and wherein.

DETAILED DESCRIPTION OF THE PREFERRED EMBODIMENTS

A description will now be given of the embodiment of the present invention.

Figure 1:
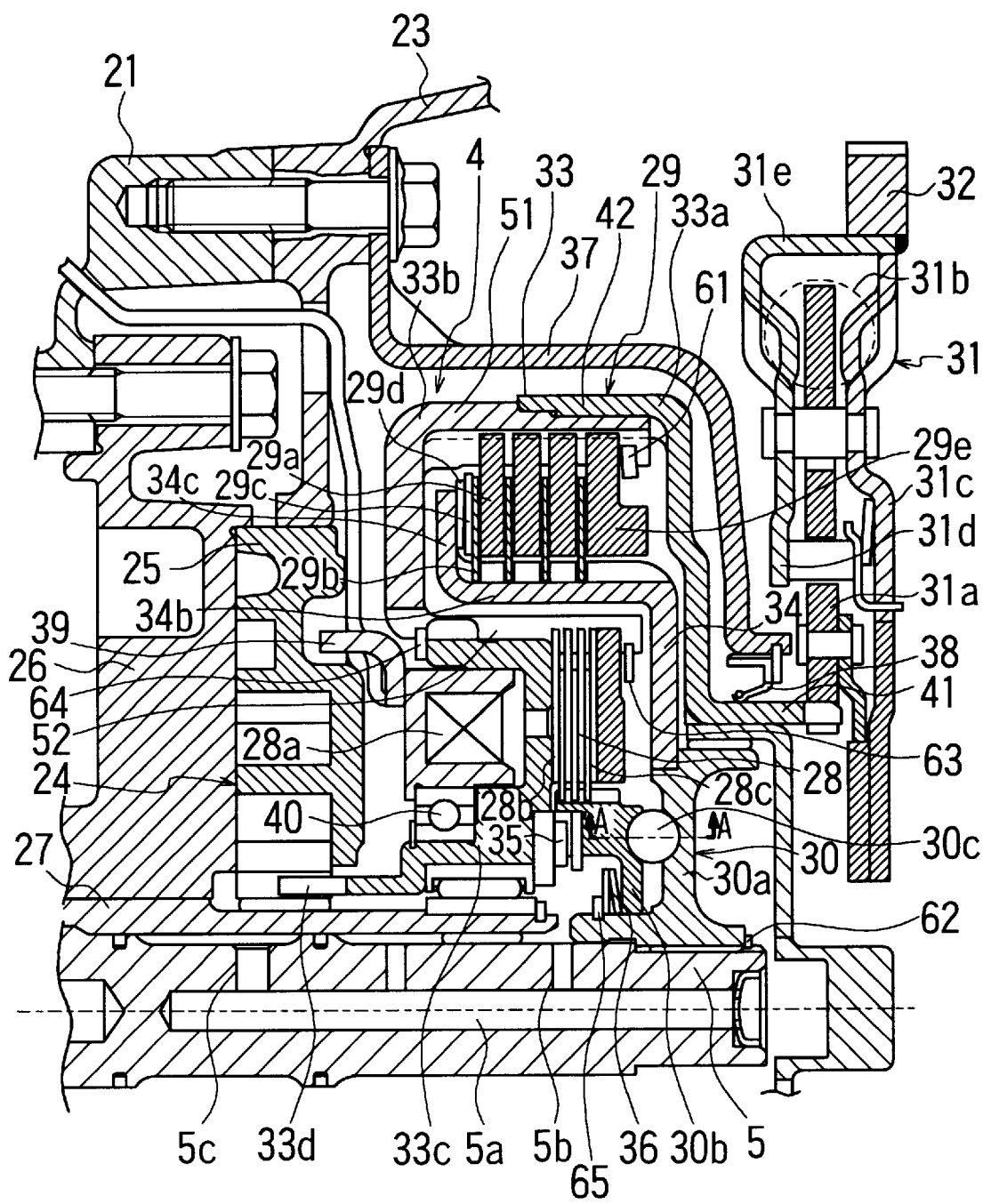
FIG. 1 is a cross sectional view showing the structure of the electromagnetic multiple disc starting clutch of in the embodiment of the present invention.

FIG. 1 is a cross sectional view showing the structure of the electromagnetic multiple disc starting clutch of the embodiment.

A drive plate 32 is provided on the engine side of the inside of an input clutch housing 23 that is connected to the front end of a transmission case 21 and to an unillustrated engine cylinder block. The drive plate 32 is supported by an input clutch pack 29 (described below) via a torsional damper 31. In addition, an unillustrated transmission mechanism is housed inside the transmission case 21.

The torsional damper 31 is formed from a disc shaped output plate 31a, an input plate 31e that sandwiches the output plate 31a from both sides via a first plate 31c and a second plate 31d, and a coil spring (spring) 31b that is provided between the input plate 31e and the output plate 31a.

Namely, a plurality of windows that correspond to each other are provided in the circumferential direction in the first and second plates 31c and 31d of the input plate 31e and in the output plate 31a. The coil spring 31b is provided inside the windows overlapping each other of the input plate 31e and the output plate 31a.

When a relative rotational displacement is generated by the torque variation between the input plate 31e and the output plate 31a, the coil spring 31b is compressed between the peripheral edges of the windows that are facing each other in the circumferential direction allowing the torque variation when the vehicle starts to be absorbed.

Teeth are formed on the inner periphery of the output plate 31a and these mesh with the input drum (drum) 33 described below.

An input clutch 4 is provided at a position on the transmission mechanism side of the torsional damper 31. The input clutch 4 is formed from the input clutch pack 29, an electromagnetic clutch 28, and a loading cam 30.

The input clutch pack 29 is a normal wet type multiple disc clutch and the front surface and outer periphery thereof on the torsional damper 31 side are covered by a front cover 37 that is fixed by bolts to the transmission case 21 via the input clutch housing 23.

The driving side of the input clutch pack 29 on the engine power transmission path is formed from the input drum 33, metal plates (the drive side plates) 29a, and a retaining plate 29e, while the driven side is formed from the input clutch hub (the hub) 34 and the facing plates (the driven side plates) 29b.

The input drum 33 is formed from the input drum 33a and the input drum 33b. The input drum 33a is formed from a first drum portion 41 that extends parallel with the input shaft 5 and penetrates the front cover 37, a portion that bends vertically at the end of the first drum 41 on the transmission mechanism side and extends outwards in a radial direction in a disc shape along the inside of the front cover 37, and a second drum portion 42 that extends from the outer end of the above portion parallel with the input shaft 5 towards the transmission mechanism side. Note that the end of the first drum portion 41 on the side of the torsional damper 31 is fitted to the output plate 31a. In addition, an oil seal 38 is provided between the first drum portion 41 and the front cover 37.

The input drum 33b is formed from a third drum portion 51 extending parallel with the input shaft 5, a portion that bends inwards in the radial direction at the transmission mechanism end of the third drum 51 and extends in a disc shape, and a fourth drum portion 52 that extends from the inner end of the above portion parallel with the input shaft 5 towards the torsional damper 31 side.

A step is formed on the inner side of the second drum portion 42. A step is also formed in the outer side of the third drum portion 51 matching the above step. Both members are fitted together and kept in position by these steps.

A plurality of slits are formed at predetermined intervals in the peripheral direction in the fourth drum 52 from the distal end thereof on the torsional damper 31 side to where the fourth drum 52 joins with the disc shaped portion.

A plurality of metal plates 29a are meshed with a spline formed on the inner side of the third drum 51 so as to be capable of integral rotation. The retaining plate 29e, which is held in place by a snap ring 61, restricts the range of movement of the metal plates 29a in the axial direction towards the third drum portion 51. Note that, by making the thickness of the distal end portion of the retaining plate 29e thicker using the space demarcated by the input drum 33a and providing it with a step, the inertial mass is increased.

In contrast, the input clutch hub 34 on the driven side is formed from a drum portion 34b, a flange portion 34c that extends upward from one end of the drum portion 34b towards the outside in the radial direction and parallel with the facing plates 29b, and a disc shaped portion that extends inwards in the radial direction from the other end of the drum portion 34b and joins with the outer peripheral end of the hub portion 30a (described below) of the loading cam 30. Note that the inner peripheral end of the hub portion 30a is spline meshed with the input shaft 5 and is held in place by a snap ring 62.

The facing plates 29b, to both surfaces of which a friction material facing is adhered, mesh with the spline formed in the outside of the drum portion 34b and are able to rotate integrally therewith.

A floating plate 29c is provided between the flange portion 34c and the facing plates 29b to prevent abrasion or peeling of the facing surface. In addition, a dish plate 29d in the form of a coned disc spring is provided to absorb torque that is suddenly generated.

The metal plates 29a and the facing plates 29b are arranged in alternation in the axial direction. The drive side of the input clutch pack 29 receives power and is rotated due to one end of the input drum 33 fitting together with the output plate 31a of the torsional damper 31. When the metal plates 29a and the facing plates 29b are pressed together, the input clutch pack 29 is engaged by the contact friction force between these and the torque is transmitted to the driven side.

Because a uniform heating value is thermally conducted in each metal plate 29a when the metal plates 29a and the facing plates 29b are transmitting the power while in sliding contact with each other, the thickness of each metal plate 29a is made the same for each plate in order to increase the heat resistance and durability thereof.

The electromagnetic clutch 28 is provided at the inner side in the radial direction of the fourth drum portion 52 of the input drum 33b. The electromagnetic clutch 28 is formed from drive side friction plates 28b, driven side friction plates 28c, an electromagnet 28a, and a rotor 33c. The plurality of drive side friction plates 28b mesh with slits formed in the fourth drum portion 52 so as to be integrally rotatable therewith, while the plurality of driven side friction plates 28c mesh with a spline formed in the outer peripheral end of a linking portion 30b, which is described below, of the loading cam 30 so as to be integrally rotatable therewith.

The electromagnet 28a is provided at the transmission mechanism side of the drive side friction plates 28b and is supported by a pump housing 25 of an oil pump 24 via a bracket 39. Moreover, the rotor 33c that surrounds the electromagnet 28a in a U shape from the side of the drive side and driven side friction plates 28b and 28c is provided so as to be able to rotate relatively to the electromagnet 28a via a bearing 40. Teeth are formed on the outer peripheral end of the rotor 33c and these teeth mesh with slits in the fourth drum portion 52 so as to be integrally rotatable therewith. The inner peripheral side of the rotor 33c extends towards the transmission mechanism side parallel with the input shaft 5, and an end 33d of the rotor 33c forms a drive pawl for the oil pump 24.

On the inner side of the fourth drum portion 52, the range of movement of the rotor 33c and the drive side friction plates 28b is restricted on both sides in the axial direction by the snap rings 63 and 64.

The drive side friction plates 28b and the driven side friction plates 28c are provided in alternation. When electricity is supplied to the electromagnet 28a both sets of friction plates are pressed such that the electromagnetic clutch 28 is engaged and the input drum 33 and the linking portion 30b rotate integrally.

The oil pump 24 is a normal gear pump that is structured so as to house internal gear pump elements within spaces created by the pump housing 25 and the pump cover 26. The oil pump 24 is placed between the transmission case 21 and the input clutch housing 23. A hollow sleeve 27 is fitted in the inner periphery of the pump cover 26 and the input shaft 5 is inserted inside the hollow sleeve 27 so as to be freely rotatable therein.

Figure 2:
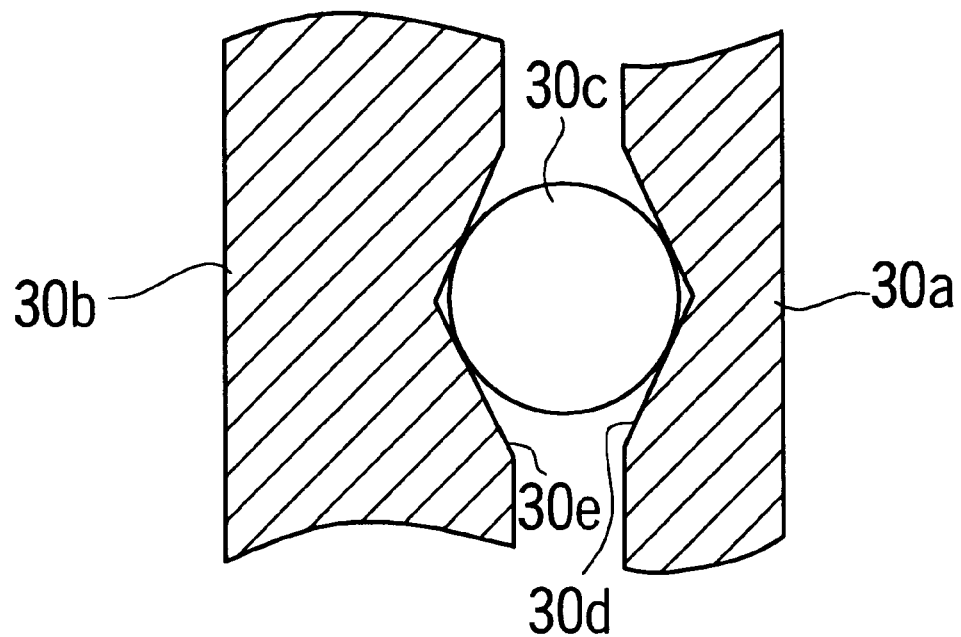
FIG. 2 is a partial cross sectional view taken through the line A—A in FIG. 1.

The loading cam 30 is formed from the hub portion 30a, the linking portion 30b, and a ball 30c. As is shown in FIG. 2, the loading cam is formed by sandwiching the ball 30c between the linking portion 30b and the hub portion 30a in which sloping surfaces 30d and 30e have been formed sloping in the peripheral direction. The ball 30c is rolled on the sloping surfaces 30d and 30e by the relative rotation of the hub portion 30a and the linking portion 30b around the input shaft 5, and a thrust force pulling the hub portion 30a and the linking portion 30b apart is generated in the axial direction. A thrust bearing for transmitting the thrust force in the axial direction is provided between the linking portion 30b and the rotor 33c.

Note that the hub portion 30a and the linking portion 30b are urged by a return coned disc spring 36 so as to press the ball 30c placed between them. If the thrust force pulling apart the linking portion 30b and the hub portion 30a of the loading cam 30 is not greater than the set load of the return coned disc spring 36, then there is no engaging force generated on the input clutch 4. The return coned disc spring 36 is held in place by a snap ring 65.

Lubricating oil supplied from an unillustrated control valve circuit is fed from the aperture portion 5c of the input shaft 5 via a hollow portion 5a and an aperture portion 5b into the space between the loading cam 30 and the rotor 33c. This lubricating oil lubricates the thrust bearing 35 and then moves on to lubricate the drive side friction plate 28b and the driven side friction plate 28c. It then passes through an unillustrated aperture portion provided in the drum portion 34b and lubricates the metal plates 29a and the facing plates 29b.

Further, the lubricating oil passes through several unillustrated apertures formed in the third drum portion 51 and is stored in the space on the inner side of the front cover 37. It then passes through an unillustrated drain port opened in the bottom end portion of the input clutch housing 23 and is returned to an oil pan provided on the transmission mechanism side.

Next, a description will be given of the function of each element.

The power from the engine is transmitted from the drive plate 32 to the input drum 33 of the input clutch pack 29 via the torsional damper 31.

The drive side of the input clutch pack 29, namely, the input drum 33, the metal plate 29a, and the retaining plate 29e is rotated as a result of the transmission of the power from the engine. If the input clutch pack 29 is disengaged at this time, the rotation is not transmitted to the input clutch hub 34 and the input shaft 5 does not rotate.

The drive system torsional vibration model when the input clutch pack 29 is disengaged is a single-degree-of-freedom model comprising the inertial mass Ie on the engine side with the engine serving as the vibration source, the coil spring 31b, and the inertial mass Ip on the drive side. Note that the engine side inertial mass Ie is the inertial mass of the drive plate 32 and the input plate 31e, while the drive side inertial mass Ip is the inertial mass of all the elements (the input drum 33, the metal plates 29a, and the retaining plate 29e) on the drive side of the input clutch pack 29, the output plate 31a, the drive side friction plates 28b, the rotor 33c, and the like.

In the present embodiment, by increasing the plate thickness of the metal plates 29a and the retaining plate 29e, the drive side inertial mass Ip is set to 50% to 100% of the engine side inertial mass Ie.

Figure 3:
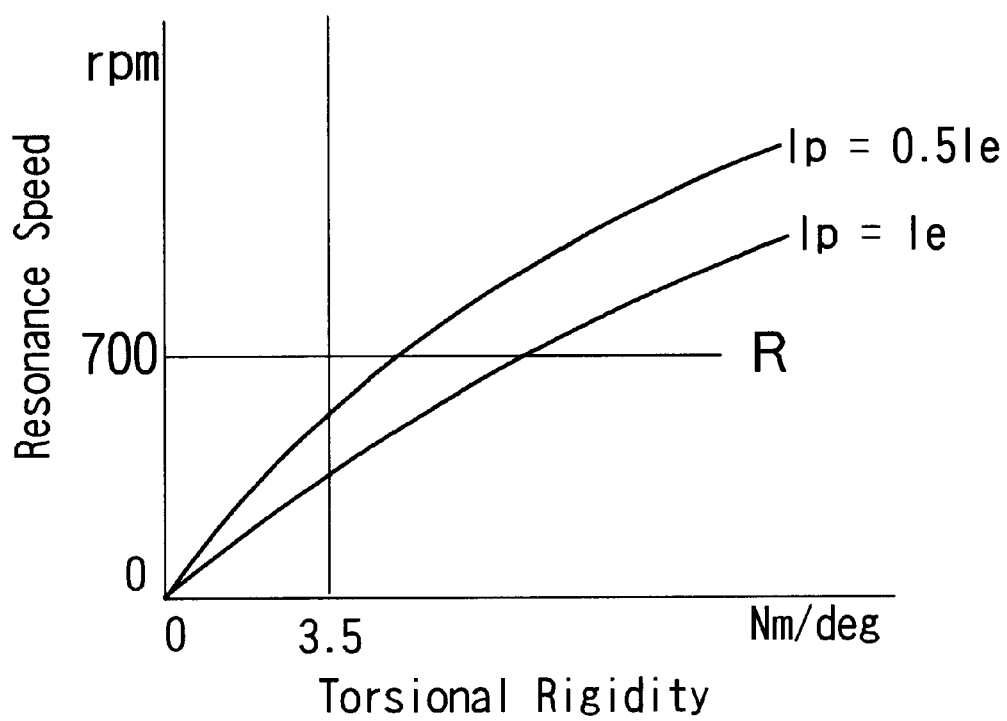
FIG. 3 is a graph showing the relationship between the torsional rigidity and the resonance speed in a drive system torsional vibration model when the clutch is disengaged.

In a normal passenger vehicle, because a coil spring 31b that gives a torsional rigidity of approximately 3.5 Nm/deg is used, as is evident in the relationship between the resonance speed and the torsional rigidity shown in FIG. 3, by setting the drive side inertial mass Ip to 50% to 100% of the engine side inertial mass Ie, it is possible to reduce the resonance speed to a considerable level below the idling speed R.

The drive side friction plates 28b are rotated by receiving power from the engine. When the electromagnetic clutch 28 is engaged, the driven side friction plates 28c and the linking portion 30b are also rotated by receiving transmitted power, and a thrust force is generated that attempts to move the hub portion 3a towards the right side in FIG. 1 due to the cam action when the ball 30c rolls over the sloping surfaces.

In contrast, as a counter force to this thrust force, a thrust force is generated via the thrust bearing 35 that attempts to move the rotor 33c and the input drum 33 towards the left side in FIG. 1 in resistance to the return coned disc spring 36. Because the movement of the hub portion 30a is restricted in the axial direction by the snap ring 62, the input drum 33 moves to the left. As a result, the flange portion 34c and the retaining plate 29e clamp the plurality of metal plates 29a and facing plates 29b from both sides in a sandwiched state, and torque is transmitted by the contact friction force of both the metal plate 29a and facing plate 29b.

The present embodiment is structured as has been described above. Because it is possible to make the drive side inertial mass Ip 50% to 100% of the engine side inertial mass Ie by increasing the plate thickness of the retaining plate 29e, it is possible to prevent drive system torsional vibration resonance when idling while keeping the increase in weight to the minimum. The increasing of the plate thickness is also connected to an increase in rigidity and an increase in the thermal capacity of the input clutch pack 29 and also improves the judder resistance as well as the heat resistance and durability of the clutch.

Moreover, in contrast to a conventional clutch in which a hub is placed on the drive side and a drum is placed on the driven side and a large space is needed to provide a case extending along the outer side of the drum for the transmitting of the engine rotation to the hub, in the present embodiment, by doing away with the case and forming the drive side from a drum with a large diameter while making the entire structure compact, the drive side inertial mass is increased.

Furthermore, as a result of making the plate thickness of each of the metal plates 29a the same in each plate, the heating value created by the friction is dispersed uniformly thereby increasing the heat resistance and durability.

Note that the present invention is not limited to the above embodiment.

For example, although the drive side inertial mass Ip is set to 50% to 100% of the engine side inertial mass Ie in the embodiment, however, it is sufficient if the size of the Ip (i.e. the plate thickness of the metal plates 29a and the retaining plate 29e) is set appropriately such that the aim of preventing drive system torsional vibration resonance when the engine is idling while keeping any weight increase to the minimum is achieved.

Further, a hydraulic clutch may be used instead of the electromagnetic clutch 28.

It is also possible to increase the drive side inertial mass Ip by increasing the thickness of the drive side friction plates 28b of the electromagnetic clutch 28.

Though, in order to prevent abrasion and peeling of the facing surfaces of the facing plate 29b, the floating plate 29c is provided between the flange portion 34c and the facing plates 29b in the embodiment, however, if a friction material facing is adhered only to the surface that makes contact with the metal plate 29a of only the facing plate 29b that is closest to the flange portion 34c and no friction material facing is adhered to the flange portion 34c side, then the floating plate does not need to be inserted.

Moreover, the dish plate 29d is provided for surge torque absorption between the flange portion 34c and the facing plates 29b, however, if the generation of surge torque can be suppressed by control, then the dish plate 29d does not need to be inserted.

What is claimed is:

1. A starting clutch that is provided at an input side of a transmission mechanism of a vehicle transmission, comprising:
   a drum for receiving rotation drive force from an engine via a torsional damper provided with a spring;
   a hub provided at an inner side of the drum and linked to an input shaft of the transmission mechanism;
   drive side plates and driven side plates that mesh respectively with the drum and the hub, the drive side plates and the driven side plates being stacked together in alternation; and
   a retaining plate that mesh with the drum for restricting a range of movement of the drive side plates,
   wherein a plate thickness of the drive side plates is made thicker than a plate thickness of the driven side plates,
   wherein the retaining plate has a thicker portion to increase the inertial mass.

2. The starting clutch according to claim 1, wherein the plate thickness of the drive side plates is made the same for each plate.

3. A starting clutch provided at an input side of a transmission mechanism of a vehicle transmission, comprising:
   a drum for receiving rotation drive force from an engine via a torsional damper provided with a spring;
   a hub provided at an inner side of the drum and linked to an input shaft of the transmission mechanism; and
   drive side plates and driven side plates that mesh respectively with the drum and the hub, the drive side plates and the driven side plates being stacked together in alternation,
   wherein a plate thickness of the drive side plates is made thicker than a plate thickness of the driven side plates,
   wherein the plate thickness of the drive side plates is set such that drive side inertial mass from a member that is linked to the drum, sandwiching the torsional damper spring and including the drive side plates, is 50% to 100% of engine side inertial mass from an engine side member.

4. The starting clutch according to claim 3, wherein the plate thickness of the drive side plates is made the same for each plate.

5. A starting clutch provided at an input side of a transmission mechanism of a vehicle transmission, comprising:
   a drum for receiving rotation drive force from an engine via a torsional damper provided with a spring;
   a hub provided at an inner side of the drum and linked to an input shaft of the transmission mechanism; and
   drive side plates and driven side plates that mesh respectively with the drum and the hub, the drive side plates and the driven side plates being stacked together in alternation,
   wherein a flange portion is formed integrally with the hub,
   wherein a floating plate is provided between the driven side plates and the flange portion, and
   wherein a plate thickness of the drive side plates is made thicker than a plate thickness of the driven side plates.

6. The staffing clutch according to claim 5, wherein only the driven side plate closest to the flange portion is formed without a friction material being adhered to a surface of this driven side plate on the side that makes contact with the flange potion.

7. The starting clutch according to claim 6, wherein the plate thickness of the drive side plates is made the same for each plate.

8. The starting clutch according to claim 5, wherein the plate thickness of the drive side plates is made the same for each plate.

9. A starting clutch provided at art input side of a transmission mechanism of a vehicle transmission, comprising:
   a drum for receiving rotation drive force from an engine via a torsional damper provided with a spring;
   a hub provided at an inner side of the drum and linked to an input shaft of the transmission mechanism; and
   drive side plates and driven side plates that mesh respectively with the drum and the hub, the drive side plates and the driven side plates being stacked together in alternation,
   wherein a plate thickness of the drive side plates is made thicker than a plate thickness of the driven side plates,
   wherein a flange portion is formed integrally with the hub, and
   wherein only the driven side plate closest to the flange portion is formed without a friction material being adhered to a surface of this driven side plate on the side that makes contact with the flange portion.

10. The starting clutch according to claim 9, wherein the plate thickness of the drive side plates is made the same for each plate.

* * * * *